(12) United States Patent
Ouellette

(10) Patent No.: US 6,209,709 B1
(45) Date of Patent: Apr. 3, 2001

(54) DUNNAGE INFEED STATION

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 09/220,532

(22) Filed: Dec. 24, 1998

(51) Int. Cl.[7] ................................................. B65G 29/00

(52) U.S. Cl. ........................................................ 198/468.8

(58) Field of Search .......................................... 198/468.8

(56) References Cited

U.S. PATENT DOCUMENTS

| | | | |
|---|---|---|---|
| 4,634,329 | * | 1/1987 | Diederen et al. ................ 198/468.8 |
| 4,711,342 | * | 12/1987 | Abraham ........................... 198/468.8 |
| 5,401,160 | * | 3/1995 | Bellattato ......................... 198/468.8 |

* cited by examiner

*Primary Examiner*—Robert P. Olszewski
*Assistant Examiner*—Bryan Jaketic
(74) *Attorney, Agent, or Firm*—Howell & Haferkamp, LC

(57) ABSTRACT

A dunnage infeed station is designed to receive generally planar dunnage objects such as tier sheets and tier sheet picture frames from a forklift and to deposit a stack of the dunnage objects onto a conveyor which transports the stack out from the infeed station.

18 Claims, 3 Drawing Sheets

DUNNAGE INFEED STATION

BACKGROUND OF THE INVENTION

The present invention pertains to a dunnage infeed station that is designed to receive generally planar dunnage objects, such as tier sheets and tier sheet picture frames, from a forklift and to deposit a stack of the dunnage objects onto a conveyor which transports the stack out from the infeed station.

More particularly, the present invention pertains to a dunnage infeed station comprised of a roller conveyor and an elevating mechanism positioned below rollers of the conveyor. The elevating mechanism is selectively operated to raise parallel upright plates between adjacent rollers of the conveyor where a stack of dunnage objects can be deposited onto the plates from a forklift. The plates are then lowered by the elevating mechanism, thereby placing the stack of objects onto the roller conveyor which transports the stack of objects out from the infeed station.

DESCRIPTION OF THE RELATED ART

In present known methods of transporting articles on a pallet, layers of the articles arranged on a pallet are commonly separated by a tier sheet. The tier sheet is usually a square or rectangular piece of cardboard. It is first placed onto the pallet before the first layer of articles is arranged on the pallet so that the tier sheet can provide a smooth planar surface for this first layer of articles. A second tier sheet is then positioned on top of the first layer of articles to again provide a smooth surface for the next layer of articles to be arranged on the pallet. Subsequent layers of articles arranged on the pallet are each separated by a tier sheet in this manner. A picture frame, or a relatively thin frame constructed of wood (or other materials) and having the peripheral dimensions of the tier sheet, is then placed on the topmost tier sheet in the stack on the pallet. The picture frame reinforces the topmost tier sheet on the stack and provides a more rigid support for receiving banding wrapped around the pallet and the picture frame to secure the stack of articles on the pallet, and/or shrink wrap wrapped around the pallet, picture frame and the stack of articles therebetween to further secure the stack of articles on the pallet.

Both tier sheets and picture frames are intended to be reusable in stacking layers of articles on pallets. Therefore, where articles are being loaded onto or unloaded from pallets, it has been seen to be time efficient to arrange stacks of tier sheets and stacks of picture frames and transporting those stacks of tier sheets and stacks of picture frames to where they are needed. Very often, the stacking of tier sheets and picture frames is done manually. The stacks are then moved by a forklift to a conveyor where the forklift is employed to place the stack of objects onto the conveyor.

However, it is very difficult to transfer a stack of objects from the forks of a forklift onto a conveyor. For example, if the objects were being transferred from the forklift onto a roller conveyor, the rollers of the conveyor would need to be spaced far enough apart so that the forks could be lowered between pairs of adjacent rollers to the extent that the top surfaces of the pairs of adjacent rollers would project upwardly above the forks to enable setting the stack of objects onto the rollers. With the stack of objects then supported on the rollers, the forks could be withdrawn. However, this would still require that the forks be withdrawn by reversing the forklift in a straight line from the conveyor in order to slide the forks out from between the pairs of rollers and beneath the stack of objects. In some situations, there is insufficient floor space to allow a forklift to be reversed in a straight line from the side of a roller conveyor.

In addition, it is difficult to pick up a stack of objects resting on a conveyor such as a roller conveyor. With the stack of objects resting directly on the top surfaces of the conveyor rollers, it is difficult to insert the tips of the forks between the stack of objects and the top surfaces of the rollers. Again, it would require a roller conveyor specifically designed with rollers of enlarged diameters that are spaced sufficiently far apart to enable the forks of the forklift to be inserted between pairs of adjacent rollers and beneath the stack of objects supported on the rollers. Also, spacing the rollers farther apart could cause tier sheets to sag into the gap of adjacent rollers. In addition, because the pair of forks would need to be inserted between the pairs of adjacent rollers in order to position the forks beneath the stack of objects supported by the rollers, the forklift could only approach the stack by moving forward in a straight line toward the side of the roller conveyor. Again, in some applications there may not be sufficient floor space available to position the forklift in this manner.

SUMMARY OF THE INVENTION

The present invention provides a dunnage infeed station that enables a forklift transporting a stack of dunnage objects to quickly position the objects on a conveyor for further transport of the stack of objects by the conveyor. What is meant herein by a stack of dunnage objects in primarily a stack of tier sheets or a stack of picture frames. However, the dunnage infeed station may be employed in receiving a stack of other similar types of dunnage objects, for example some forms of pallets. In addition, although the station is described as being an infeed station for receiving a stack of dunnage objects, the station could also be employed as an outloading station for a stack of dunnage objects that are to be removed from a conveyor by a forklift. The description of the station is not intended to limit it for use with any particular dunnage object or to limit the use as an infeeding station or outloading station of the objects.

The station is basically comprised of a support table supporting a conveyor section of the station at a slightly elevated horizontal position, a lifting mechanism positioned below the table and a pair of positioning walls that project upwardly from two sides of the table. In the preferred embodiment, the table is a side loading table meaning that a forklift transporting a stack of objects will approach the table laterally from one side of the table and the conveyor section of the station will transport the stack of objects out of the station longitudinally along the length of the conveyor. The station could be employed with loading of the station from other directions with minor modifications.

The supporting table supports the conveyor that in the preferred embodiment is a roller conveyor. The table supports a plurality of elongated rollers that are arranged side by side with center axes of the rollers extending laterally and parallel to each other. The plurality of rollers are arranged relative to each other with the top surfaces of the rollers defining a horizontal plane at the top of the conveyor. A plurality of sprockets are connected to the plurality of rollers at one side of the supporting table. A chain drive interconnects the sprockets and rotates all of the rollers of the plurality in one direction to transport a stack of objects out of the infeed station and along the length of the conveyor.

A sidewall projects upwardly from the support table at a longitudinal end of the conveyor path. A back wall also projects upwardly from the support table adjacent a lateral side of the conveyor and adjacent the sidewall. Preferably, the back wall and sidewall are positioned at a right angle to each other and are positioned sufficiently close to the horizontal plane defined by the top of the conveyor to come into contact with the stack of objects being loading by a forklift into the infeed station to move the stack of objects on the forklift forks and orient the stack with opposite lateral edges of the stack of dunnage objects generally aligned with the longitudinal direction of the conveyor transport path.

The elevating mechanism is generally comprised of a plurality of air bladders, a horizontal base supported on the air bladders and a plurality of uprights supported on and projecting upwardly from the base. The plurality of air bladders are interconnected with a pneumatic control circuit that can be selectively controlled to supply pneumatic pressure to the air bladders and to vent pneumatic pressure from the air bladders. The control system can be controlled to operate manually to selectively supply and vent the air pressure, or can be controlled to operate in response to signals received from photo sensors. The supply of pneumatic pressure to the air bladders causes the air bladders to inflate and raise the base beneath the conveyor. The venting of pneumatic pressure from the air bladders causes the bladders to deflate and lower the base relative to the conveyor. The plurality of uprights are arranged on the base where they will project between adjacent rollers of the conveyor to positions above the horizontal plane defined by the conveyor rollers when the air bladders are inflated. The vertical height of the plurality of uprights positions the uprights below the horizontal plane defined by the conveyor when the air bladders are deflated and the base is lowered relative to the conveyor.

The vertical height of the uprights and their positioning relative to each other also enables the forks of a forklift to be positioned between the horizontal plane defined by the conveyor and the top most ends of the uprights when the uprights are moved to their raised position. In addition, several of the plurality of uprights are arranged in a laterally staggered arrangement relative to each other. The laterally staggered arrangement of the uprights enables a forklift to back away from the conveyor in a confined area with its forks inserted between the raised uprights. The forklift turns from a laterally oriented position relative to the conveyor to a longitudinally oriented position relative to the conveyor when reversing away from the conveyor after loading a stack of objects on the raised uprights. The laterally staggered arrangement of the uprights also enables the forklift to approach a stack of objects supported on the raised uprights in a confined area by approaching the stack in a longitudinally oriented position of the forklift relative to the conveyor while turning to a laterally oriented position of the forklift relative to the conveyor inserting its forks between the raised uprights prior to unloading the stack of objects from the uprights. This enables the forklift to both load stacks of objects onto the raised uprights and then withdraw its forks, and to unload a stack of objects from the raised uprights where the floor space available for maneuvering the forklift is limited to the extent that the forklift cannot approach and back away from the conveyor in a straight line lateral direction.

In operation in loading a stack of objects on the conveyor, the plurality of uprights are first raised by the elevating mechanism either manually or automatically so that the uprights project upwardly through the horizontal plane defined by the tops of the conveyor rollers to positions above the rollers of the conveyor. A forklift having a stack of dunnage objects supported on its forks is then moved toward the station with the forks supporting the stack of objects projecting above and laterally between uprights of the plurality of uprights. The forks may then be lowered by the forklift operator so that the stack of objects is supported on the raised uprights with the forks positioned vertically between the topmost edges of the uprights and the horizontal plane defined by the top surfaces of the conveyor rollers. The forks may then be retracted by reversing the forklift while simultaneously turning the forklift from its lateral orientation relative to the conveyor to a longitudinal orientation of the forklift relative to the conveyor. When the forks clear the conveyor and the uprights, the elevating mechanism may then be operated to lower the plurality of uprights thus placing the stack of objects onto the horizontal plane defined by the top surfaces of the rollers. Rotation of the rollers by the conveyor drive system then transports the stack of objects out from the infeed station and longitudinally down the path of the conveyor.

In operation in unloading a stack of objects from the conveyor, the uprights are raised lifting the stack of objects above the conveyor rollers. The forklift then approaches the conveyor to position its forks beneath the stack of objects and above the conveyor rollers with the forks extending laterally between the uprights of the elevating mechanism. Because several of the uprights are staggered laterally relative to each other, the forklift can approach the raised stack of objects traveling in a longitudinal direction relative to the conveyor and then turning so that its forks are positioned extending laterally across the conveyor. This enables the forklift to approach the conveyor where the floor space adjacent the conveyor is limited. With the forklift forks positioned beneath the stack of objects and extending laterally between the raised uprights, the forks of the forklift are then raised to lift the stack. The forklift may then be withdrawn from the conveyor.

In addition, because the stack of objects can be loaded onto the raised uprights without the forks of the forklift ever coming into contact with the top surfaces of the rollers, the drive system of the conveyor rollers can be operated continuously as stacks of objects are loaded into the infeed station of the conveyor.

BRIEF DESCRIPTION OF THE DRAWINGS

Further objects and features of the present invention will be revealed in the following detailed description of the preferred embodiment of the invention and in the drawing figures wherein.

DESCRIPTION OF THE PREFERRED EMBODIMENT

Figure 1:
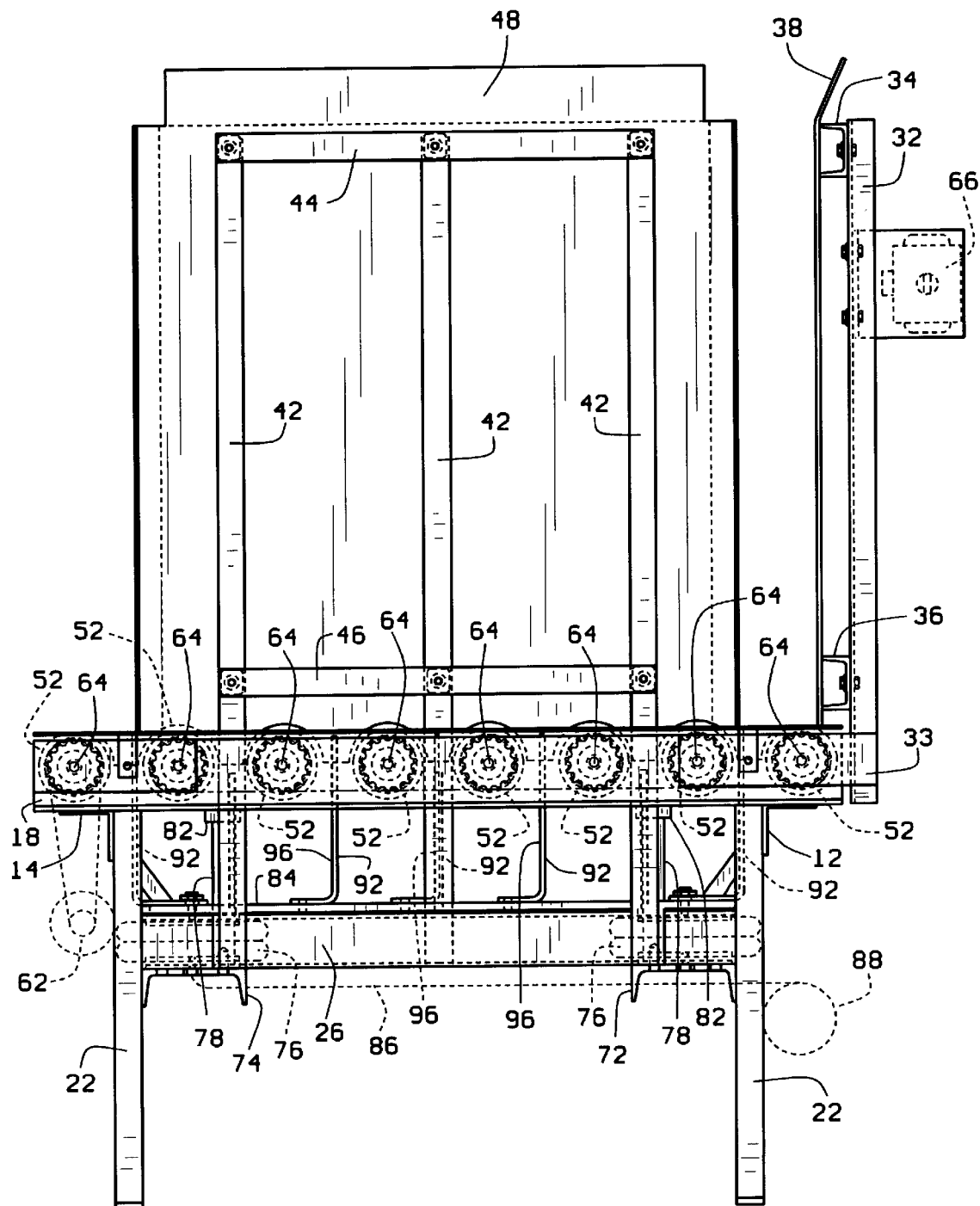
FIG. 1 is a rear elevation view of the dunnage infeed station of the invention.

The dunnage infeed station of the present invention basically combines a roller conveyor with an elevating mechanism. The elevating mechanism is constructed to support a stack of dunnage objects, for example tier sheets and/or picture frames, above the horizontal plane defined by the roller conveyor. The elevating mechanism facilitates the loading of a stack of objects onto the roller conveyor and also facilitates the unloading of a stack of objects from the roller conveyor. The particular construction of the elevating mechanism enables a forklift to approach the infeed section from the side and then turn toward the infeed section to position its forks laterally across and above the conveyor to position the forks for loading objects on the conveyor and unloading objects from the conveyor where the floor space is confined preventing the forklift from approaching the conveyor and departing from the conveyor in a straight lateral line.

In addition, a forklift transporting the stack of dunnage objects may place the stack on the elevating mechanism above the horizontal plane of the roller conveyor while the conveyor is still running. After the forklift has withdrawn its forks from beneath the stack loaded on the elevated mechanism, the lowering of the elevating mechanism places the stack of objects onto the horizontal support surface defined by the conveyor rollers where the conveyor rollers transport the stack of objects in a downstream direction out of the infeed station.

Although controlling the raising and lowering of the elevator mechanism while the conveyor continues to run would significantly improve the time efficiency in loading stacks of dunnage objects on the conveyor, the conveyor could be automatically or manually controlled to stop while the raised elevating mechanism is moved to its lowered position in loading a stack of objects onto the horizontal support surface defined by the conveyor. The conveyor then would be automatically or manually controlled to actuate the drive mechanism of the conveyor causing it to transport the stack of objects in a downstream direction along the conveyor path and out of the infeed section. In addition, although the infeed station is described as being used for stacks of dunnage objects such as tier sheets and/or picture frames, it could also be employed in infeeding stacks of similar planner objects such as pallets, plywood or plastic sheets, etc.

The conveyor includes a support table having a rectangular, horizontal frame defined by a pair of angle iron cross braces 12, 14 that extend laterally across the frame and a pair of angle iron side braces 16, 18 that extend longitudinally along the front and back sides of the frame. The cross braces and side braces are welded or bolted together in a rectangular configuration of the support table frame. Four tubular metal legs 22 are welded to the cross braces at the corners of the frame and position the frame in an elevated horizontal orientation.

Horizontal, tubular cross beams 24, 26 extend longitudinally between pairs of the legs 22 at the laterally opposites sides of the support table. The longitudinally opposite ends of the tubular cross beams 24, 26 are welded to the pairs of legs 22 further reinforcing the legs.

Figure 2:
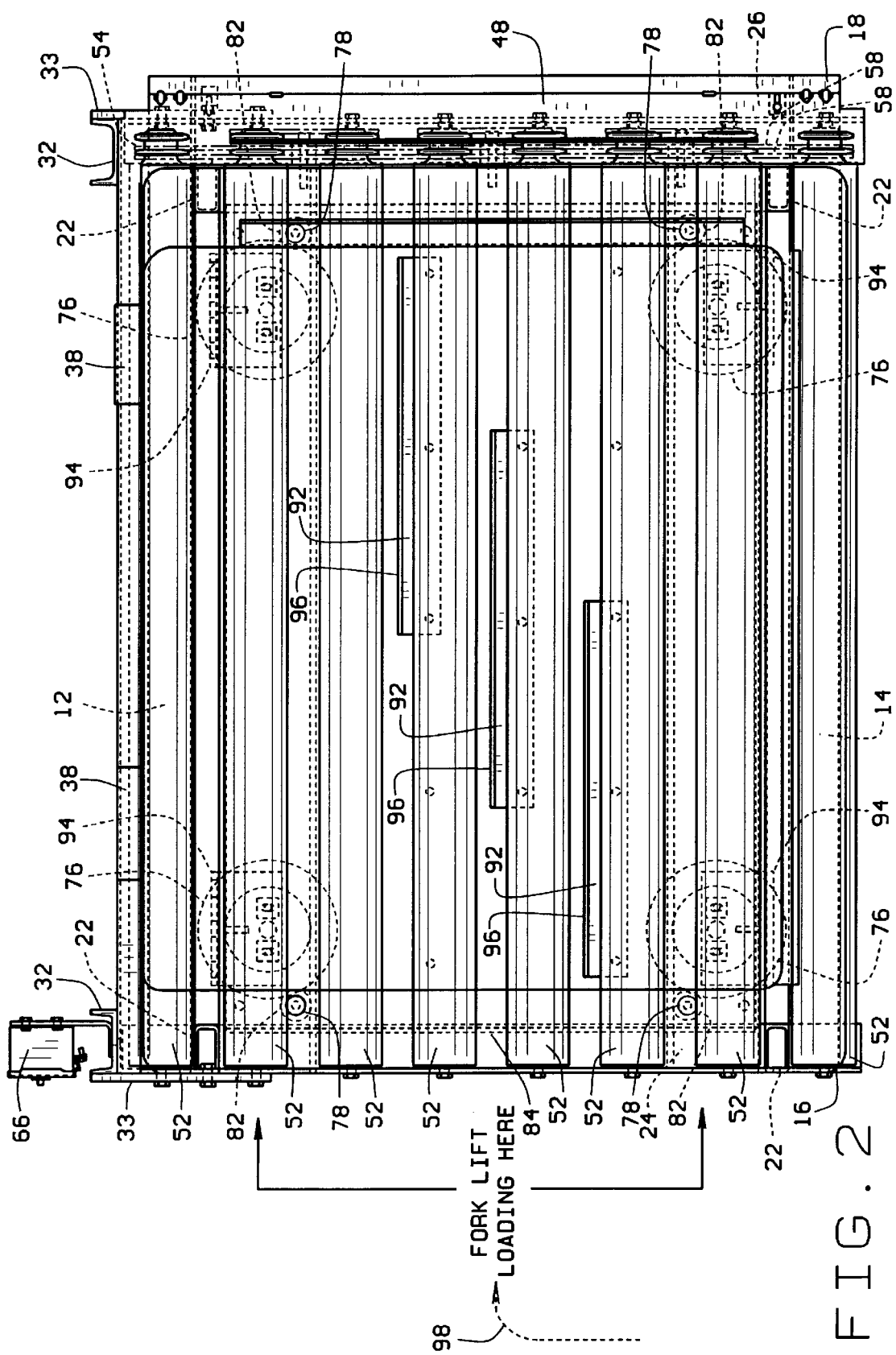
FIG. 2 is a top plan view of the station shown in FIG. 1.

Referring to FIG. 2, a pair of metal C-channels 32 are secured at their bottom ends to plates 33 by welds, and the plate are bolted to the side braces 16, 18 of the support table frame. The pair of channels 32 extend upwardly from the plates 33. A horizontal upper C-channel 34 and a horizontal lower C-channel 36 are secured across the pair of vertical C-channels 32 by nut and bolt fasteners in vertically spaced and parallel orientations. A pair of horizontally spaced and vertically upright metal stop panels 38 span across the upper 34 and lower 36 C-channels and are welded thereto. The pair of stop panels 38 define a sidewall of the conveyor.

Three horizontally spaced vertical bars 42 are welded at their bottom ends to the tubular cross beam 26 at the back of the infeed station support table. The three vertical bars 42 are all parallel to each other as they extend upwardly from the tubular cross beam 26. The three vertical bars 42 are reinforced by an upper cross bar 44 and a lower cross bar 46 that are bolted to the rearward sides of the three bars, and are further reinforced by a back wall plate 48 that is also secured to the three vertical bars 42 by nut and bolt fasteners. The back plate 48 is oriented at a right angle to the pair of stop panels 38. As represented by dashed lines in FIG. 3, horizontal spacers may be added between the three vertical bars 42 and back plate 48 to adjustably position the back plate 48 further toward the front of the conveyor infeed station.

In the preferred embodiment of the infeed station described, it is a side loading infeed station as represented by the arrows in FIG. 2 that indicate the direction of movement of a forklift loading the station. However, with minor modifications to the sidewall and back wall, the infeed station can be adapted to be loaded from different directions.

Figure 3:
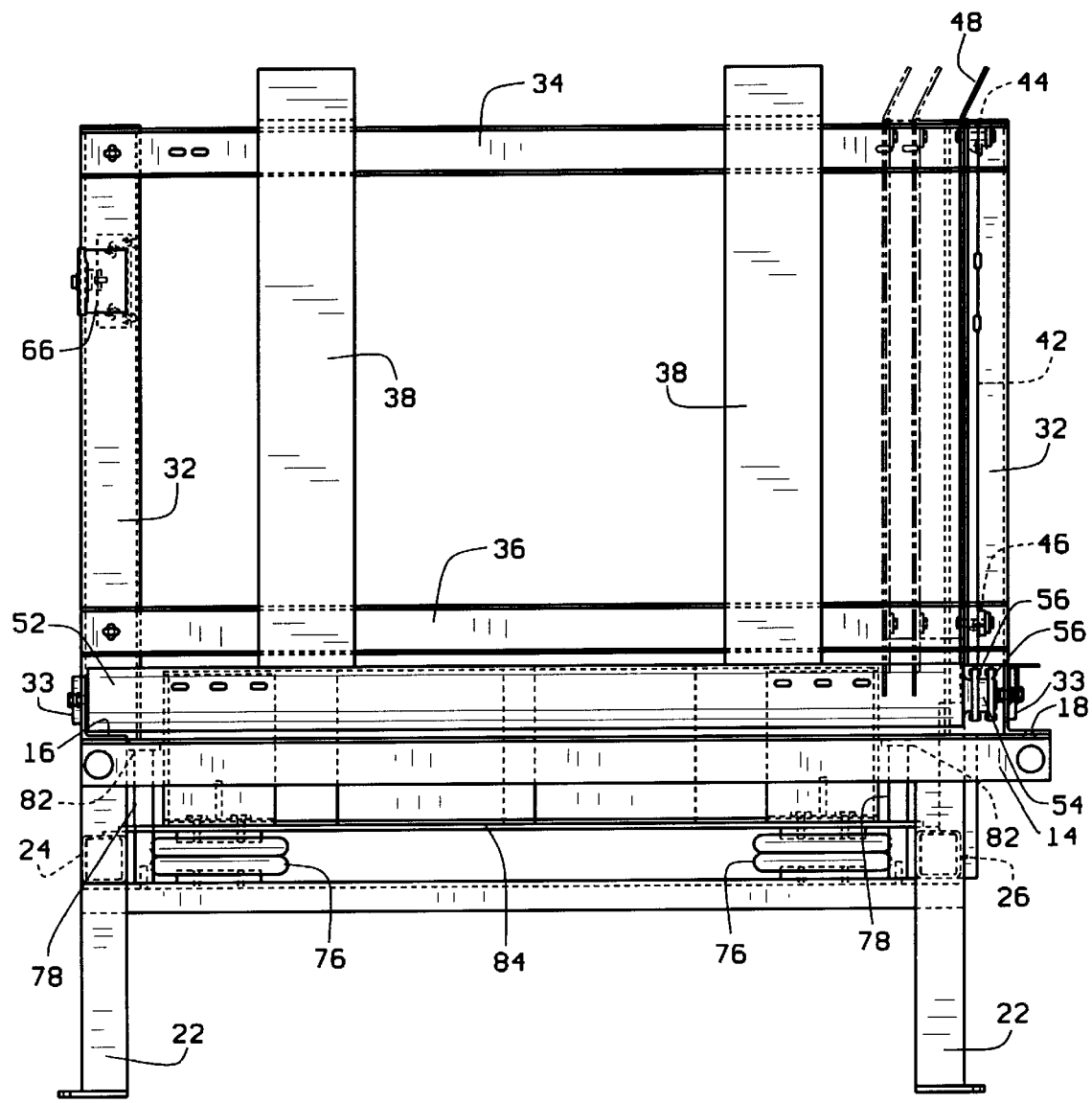
FIG. 3 is a side elevation view of the station shown in FIG. 1.

The supporting table supports the conveyor that in the preferred embodiment is a roller conveyor. The conveyor is comprised of a plurality of elongated rollers 52 that extend laterally across the support table between the pairs of side braces 16, 18. As best seen in FIGS. 2 and 3, each of the rollers is mounted for rotation between the side braces 16, 18 with top surfaces of the rollers defining a horizontal support plane of the roller conveyor. At the forward ends of the rollers, or the right hand ends of the rollers as viewed in FIGS. 2 and 3, each roller is provided with a reduced diameter neck 54 having a pair of chain drive sprockets 56 mounted thereon. As best seen in FIGS. 2 and 3, adjacent pairs of the sprockets 56 are connected by a short loop of chain 58 connecting the adjacent pairs of rollers 52 for rotation together. As best seen in FIG. 1, the center axes 64 of the rollers are all positioned parallel to each other. In this manner, the adjacent rollers drive each other and all of the rollers can be driven in one direction of rotation at the same speed from a single motive source 62 represented by dashed lines in FIG. 1.

Depending on the particular use intended for the infeed station, the motive source 62 can be operated to drive the plurality of rollers 52 either manually or automatically. A manually operated switch 66 is mounted on the front vertical C-channel 32 of the side wall assembly to enable manual loading of dunnage objects into the infeed station. For example, when manually loading tier sheets into the infeed station, it is easier to stack the sheets on the top surfaces of the rollers. Therefore, on operation of the manual switch 66 turning it to the "hand" position, the elevating mechanism is lowered so that the tier sheets can be stacked manually by first sliding the bottom group or pinch of tier sheets across the top surface of the rollers 52. The back wall 48 and side wall 38 are used to orient the first group of tier sheet and the successive tier sheets stacked on the bottom most tier sheet in an orderly stack on the conveyor rollers. Alternatively, the switch 66 can be turned to its "auto" position in which the raising and lowering of the elevating mechanism and its uprights is automatically controlled in both loading and unloading operations of the station in response to signals received from photo sensors.

The elevating mechanism is supported by the frame of the support table beneath the plurality of rollers 52. A pair of large C-channels 72, 74 are welded to pairs of the table legs 22 with the channels extending horizontally and longitudinally between the legs. The opposite ends of the C-channels 72, 74 are also welded to the undersides of the tubular cross beams 24, 26. Four air bladders 76 are mounted to the top surfaces of the pair of C-channels 72, 74. Four guide pins 78 are also mounted to the top surfaces of the C-channels 72, 74. Each of the guide pins 78 has a circular head 82 at its top most end.

A horizontal base plate 84 is mounted on top of the four air bladders 76. The base plate 84 has a generally square configuration. Four holes pass through the base plate and the four guide pins 78 pass through the holes. The holes are dimensioned sufficiently large to enable the base plate 84 to move freely vertically upwardly and downwardly along the four guide pins 78 between a lowered position of the base plate where it rests on angle iron shins on the tubular crossbeams 24, 26 as shown in FIGS. 1 and 2, and a raised position of the base plate where it engages against the undersides of the guide pin heads 82 when the air bladders are inflated.

The plurality of air bladders 76 are interconnected with a pneumatic control circuit 86 connected to a pneumatic pressure source 88 (represented by dashed lines in FIG. 1) that can be selectively controlled to supply pneumatic pressure to the air bladders inflating the air bladders and to vent pneumatic pressure from the air bladders deflating the air bladders. The control system can be controlled to operate manually to selectively supply and vent the air pressure, or can be controlled to operate automatically in response to signals received from photo sensors. The supply of pneumatic pressure to the air bladders causes the air bladders to inflate and raise the base plate 84 beneath the conveyor. The venting of pneumatic pressure from the air bladders causes the bladders to deflate and lower the base plate relative to the conveyor.

A plurality of uprights 92 are secured to the top surface of the base plate 84 by threaded fasteners with the uprights projecting upwardly from the top surface of the base plate. As best seen in FIGS. 1 and 2, the plurality of uprights 92 are arranged on the base plate 84 where they will project between adjacent rollers 52 of the roller conveyor. As best seen in FIG. 2, the plurality of uprights 92 include four uprights 94 arranged the adjacent the four corners of the base plate 84 and three uprights 96 arranged within the perimeter of the base plate. Each of the uprights are elongated panels that are positioned parallel to the center axes 64 of the rollers 52. However, the three uprights 96 within the perimeter of the base plate are much longer than the remaining four uprights. In addition, as best seen in FIG. 2, the three interior uprights 96 are arranged in a staggered arrangement. The staggered arrangement facilitates the loading and unloading of the conveyor rollers 52 by a forklift in a confined area.

As best seen in FIG. 1, the vertical heights of the plurality of uprights 92 positions the uprights below the horizontal plane defined by the top surfaces of the rollers 52 of the conveyor when the air bladders 76 are deflated and the base plate 84 is lowered relative to the conveyor. By inflating the air bladders 76 they raise the base plate 84 and the plurality of uprights 92 so that they project upwardly between the rollers 52 to vertical positions elevated above the horizontal support surface defined by the top surfaces of the rollers. The vertical height of the uprights and their positions relative to each other enables the forks of a forklift to be positioned between the horizontal plane defined by the top surfaces of the conveyor rollers 52 and top most ends of the uprights when the uprights are moved to their raised position.

In a loading operation, the plurality of uprights 92 are first raised by the elevating mechanism either manually or automatically so that the uprights project upwardly through the horizontal plane defined by the conveyor top to positions above the rollers 52 of the conveyor. A forklift having a stack of dunnage objects supported on its forks is then moved toward the station with the forks supporting the stack of objects projecting above the uprights of the plurality of uprights. In a confined area, the forklift can approach the infeed station in a longitudinal direction adjacent the side of the conveyor, and then turn toward the conveyor as indicated by the dashed line 98 in FIG. 2. The forks may then be lowered by the forklift operator so that the stack of objects is supported on the raised uprights 92 with the forks positioned vertically between the topmost edges of the uprights and the horizontal plane defined by the top surfaces of the conveyor rollers 52. The forks may then be retracted by reversing the forklift. In a confined area the forks may be retracted by reversing the forklift and turning the forklift simultaneously in a direction that is the reverse of that indicated by the dashed line 98. This is possible because of the staggered arrangement of the uprights 96. As shown in FIG. 2, in the staggered arrangement of the interior uprights 96 the upright positioned closest to the front of the infeed station is the closest upright to the direction of departure of the forklift. Farther from the direction of departure the uprights are staggered further toward the back of the infeed station. In the opposite direction of approach and departure from that indicated by the line 98, the staggering of the uprights 96 would be reversed. When the forks clear the conveyor, the elevating mechanism may then be operated to lower the plurality of uprights thus placing the stack of objects onto the horizontal plane defined by the top surfaces of the rollers 52. Rotation of the rollers by the conveyor drive system 62 then transports the stack of objects out from the infeed station and longitudinally down the path of the conveyor.

In an unloading operation, the plurality of uprights 92 are lowered by the elevating mechanism so that the top ends of the uprights are positioned below the horizontal plane defined by the conveyor rollers 52. A stack of objects is then transported by the conveyor rollers 52 to the infeed section where the stack is positioned directly above the elevating mechanism. The elevating mechanism is then automatically operated to raise the uprights 92 and thereby raise the stack of objects above the horizontal plane defined by the top surfaces of the conveyor rollers 52. As explained earlier, the vertical height of the uprights 92 positions the stack of objects a sufficient distance above the horizontal plane defined by the roller top surfaces to enable the forks of a forklift to be inserted between the stack of objects and the top surfaces of the conveyor rollers. The forklift then approaches the raised stack of objects. In a confined area, the forklift can approach the stack of objects in the direction indicated by the dashed line 98 as explained earlier. When approaching the stack of raised objects by traveling first in a longitudinal direction along the side of the conveyor and then turning toward a lateral orientation toward the stack of raised objects, the staggered positions of the interior uprights 96 enables the forks to be inserted laterally on opposite sides of the uprights 96 below the stack of objects and above the conveyor rollers as the forklift turns toward the infeed station. With the forks positioned on opposite sides of the uprights 96 and between the stack of objects and the rollers of the conveyor, the forklift then raises its forks lifting the stack of objects on the forklift forks. The forklift may then be reversed from the infeed station, again turning in the reverse direction than that indicated by the dashed line 98 in a confined area, to complete the unloading of the station.

Because the stack of objects can be loaded onto the raised uprights without the forks of the forklift ever coming into contact with the top surfaces of the rollers, the loading and unloading of the stack of objects is facilitated. In addition, the drive system of the conveyor rollers can be operated continuously as stacks of objects are loaded into the infeed station of the conveyor with the uprights raised.

In view of the above, it will be seen that the several objects of the invention are achieved and other advantageous results attained.

As various changes could be made without departing from the scope of the invention, it is intended that all matter contained in the above description or shown in the accompanying drawings shall be interpreted as illustrative and not in a limiting sense.

What is claimed:

1. A station for the loading and unloading of objects onto and from a conveyor, the station comprising:

a conveyor having a top for supporting objects on a horizontal plane defined by the conveyor top;

a plurality of uprights positioned below the horizontal plane defined by the conveyor top, at least some of the plurality of uprights are arranged in staggered positions relative to each other; and an elevating mechanism connected to the plurality of uprights for moving the plurality of uprights between a raised position of the uprights where the uprights extend through and above the horizontal plane defined by the conveyor top and a lowered position of the uprights where the uprights are below the horizontal plane defined by the conveyor top.

2. The station of claim 1, wherein:

the conveyor has a lateral width and conveys objects in a longitudinal direction, and the plurality of uprights are positioned within the conveyor lateral width.

3. The station of claim 1, wherein:

the plurality of uprights are positioned to lift an object supported on the horizontal plane defined by the conveyor top when the elevating mechanism moves the uprights to their raised position, and to lower an object supported on the uprights onto the horizontal plane defined by the conveyor top when the elevating mechanism moves the uprights to their lowered position.

4. The station of claim 1, wherein:

the conveyor is a roller conveyor having a plurality of rollers with top surfaces that define the horizontal plane.

5. The station of claim 4, wherein:

the elevating mechanism moves the plurality of uprights between the raised position where the uprights extend between the plurality of rollers and above the horizontal plane, and the lowered position where the uprights are below the horizontal plane.

6. The station of claim 5, wherein:

the plurality of rollers are elongated rollers that are arranged parallel to each other.

7. The station of claim 6, wherein:

the plurality of uprights are a plurality of parallel plates that are also parallel with the plurality of rollers.

8. The station of claim 2, wherein:

at least some of the pluralities of uprights are arranged in laterally staggered positions relative to each other.

9. The station of claim 1, wherein:

the elevating mechanism includes a base supporting the plurality of uprights and a plurality of air bladders that support the base, the plurality of air bladders are selectively inflated to raise the base and move the uprights to their raised position, and deflated to lower the base and move the uprights to their lowered position.

10. The station of claim 4, wherein:

the plurality of rollers are elongated rollers that are arranged side-by-side and have center axes that are parallel to each other, the plurality of rollers have top surfaces that together define the horizontal plane of the conveyor top.

11. The station of claim 10, wherein:

the plurality of uprights are a plurality of parallel plates that are arranged in upright orientations and are also parallel with the center axes of the plurality of rollers.

12. The station of claim 11, wherein:

a single base supports all of the plurality of plates and the elevating mechanism selectively raises and lowers the base to move the plates of the uprights between the raised and lowered positions of the uprights, respectively.

13. The station of claim 12, wherein:

the elevating mechanism includes a plurality of air bladders that support the base and are selectively inflated and deflated to raise and lower the base, respectively.

14. The station of claim 1, wherein:

a back wall and sidewall project upwardly from the horizontal plane defined by the conveyor top and are oriented at an angle to each other.

15. A station for the loading and unloading of planar objects onto and from a conveyor, the station comprising:

a plurality of rollers arranged with spacings between adjacent rollers, the plurality of rollers have laterally extending center axes;

a plurality of uprights positioned adjacent the spacings between the rollers, at least some of the plurality of uprights are arranged in a laterally staggered arrangement relative to each other; and an elevating mechanism that is operable to move the plurality of uprights between a raised position of the uprights where the uprights extend through the spacings above the rollers and a lowered position of the uprights where the uprights are retracted below the spacings between the rollers.

16. The station of claim 15, wherein:

the plurality of rollers are elongated rollers that are arranged parallel to each other with top surfaces of the rollers positioned in a horizontal plane, and the elevating mechanism moves the plurality of uprights between the raised position where the uprights extend above the horizontal plane, and the lowered position where the uprights are below the horizontal plane.

17. The station of claim 16, wherein:

the plurality of uprights are a plurality of parallel plates that are also parallel with the plurality of rollers.

18. The station of claim 16, wherein:

a drive mechanism interconnects the plurality of rollers and is operable to rotate the plurality of rollers.

* * * * *